(12) United States Patent
Bledzki et al.

(10) Patent No.: US 8,920,693 B2
(45) Date of Patent: Dec. 30, 2014

(54) METHOD FOR THE PRODUCTION OF A FIBER-REINFORCED THERMOPLASTIC POLYMER AND EXTRUSION DIE AND DEVICE FOR THE TEMPERATURE CONTROL A FIBER STRAND IMPREGNATED WITH A POLYMER MELT

(75) Inventors: Andrej Bledzki, Ahnatal (DE); Maik Feldmann, Kassel (DE); Adam Jaszkiewicz, Kassel (DE); Sebastian Ossadnik, Borken (DE)

(73) Assignee: Universität Kassel, Kassel (DE)

( * ) Notice: Subject to any disclaimer, the term of this patent is extended or adjusted under 35 U.S.C. 154(b) by 273 days.

(21) Appl. No.: 13/363,698

(22) Filed: Feb. 1, 2012

(65) Prior Publication Data

US 2012/0199998 A1 Aug. 9, 2012

(30) Foreign Application Priority Data

Feb. 4, 2011 (DE) .......................... 10 2011 010 330

(51) Int. Cl.
| | | |
|---|---|---|
| B29C 70/20 | (2006.01) | |
| B29C 47/12 | (2006.01) | |
| D07B 7/12 | (2006.01) | |
| B29B 9/14 | (2006.01) | |
| B29B 15/12 | (2006.01) | |
| B29C 70/52 | (2006.01) | |
| B29C 47/10 | (2006.01) | |
| B29K 105/10 | (2006.01) | |
| B29C 47/00 | (2006.01) | |
| B29C 47/34 | (2006.01) | |
| B29K 105/12 | (2006.01) | |

(52) U.S. Cl.
CPC ................. *B29B 9/14* (2013.01); *B29B 15/122* (2013.01); *B29C 70/523* (2013.01); *B29C 70/526* (2013.01); *B29C 47/1045* (2013.01); *B29K 2105/10* (2013.01); *B29C 47/0011* (2013.01); *B29C 47/0014* (2013.01); *B29C 47/004* (2013.01); *B29C 47/0066* (2013.01); *B29C 47/12* (2013.01); *B29C 47/34* (2013.01); *B29C 2793/0027* (2013.01); *B29K 2105/12* (2013.01)
USPC .................. 264/172.11; 264/136; 425/114

(58) Field of Classification Search
USPC ............................... 264/136, 172.11; 425/114
See application file for complete search history.

(56) References Cited

U.S. PATENT DOCUMENTS

| | | | | |
|---|---|---|---|---|
| 3,235,437 | A | * | 2/1966 | Varlet ............................ 156/551 |
| 3,688,544 | A | * | 9/1972 | Sagmuller et al. ............... 72/261 |
| 3,796,624 | A | * | 3/1974 | Avis ................................ 156/436 |
| 3,850,571 | A | * | 11/1974 | Zink et al. ....................... 431/349 |
| 5,540,797 | A | * | 7/1996 | Wilson ............................ 156/180 |

FOREIGN PATENT DOCUMENTS

| | | |
|---|---|---|
| DE | 4117270 A1 | 12/1992 |
| DE | 19540387 A1 | 5/1996 |
| EP | 0443567 A1 | 8/1991 |
| EP | 0453619 A1 | 10/1991 |
| EP | 0456035 A2 | 11/1991 |
| EP | 1436130 A1 | 7/2004 |
| WO | 9533894 A1 | 12/1995 |

* cited by examiner

*Primary Examiner* — Matthew Daniels
(74) *Attorney, Agent, or Firm* — Gifford, Krass, Sprinkle, Anderson & Citkowski, P.C.; Douglas L. Wathen (57) ABSTRACT

A method for the production of a fiber-reinforced, thermoplastic polymer, wherein at least one fiber strand is fed into an extrusion die, wherein the fiber strand is fanned out in the extrusion die, wherein the impregnation of the fiber strand with a polymer melt takes place in the fanned out state, and subsequently the fiber strand impregnated with a polymer melt is extracted from the extrusion die.

18 Claims, 6 Drawing Sheets

METHOD FOR THE PRODUCTION OF A FIBER-REINFORCED THERMOPLASTIC POLYMER AND EXTRUSION DIE AND DEVICE FOR THE TEMPERATURE CONTROL A FIBER STRAND IMPREGNATED WITH A POLYMER MELT

CROSS-REFERENCE TO RELATED APPLICATIONS

This application claims priority of German Patent Application DE102011010330.9-16 filed Feb. 4, 2011.

FIELD OF THE INVENTION

The invention relates to a method for the production of a fiber-reinforced thermoplastic polymer. The subject matter of the invention is also an extrusion die for producing a fiber strand impregnated with a polymer melt, and a device for the temperature control a fiber-reinforced fiber strand impregnated with a polymer melt. Both the extrusion die as well as the temperature control device serve in particular for executing the method.

BACKGROUND OF THE INVENTION

The application of fiber-reinforced thermoplastic granules for the production of work pieces in die casting procedures is sufficiently known from the prior art. Such granules, also called compounds, are produced in so-called compounding processes. Fiber strands are used for the production of such compounds or granules, consisting of multiple filaments. The fiber or yarn strands may consist, according to the prior art, of natural or cellulose fibers, or of glass fibers. From EP 1 436 130 B1, a method for the production of a granulate for the production of plastic molded components is known in this context, wherein, in a first step, continuous reclaimed cellulose fibers are coated with a matrix substance of a technical plastic and an adhesive agent in a pultrusion process, subsequently granulated, and then extruded again after subsequent drying process, and granulated again and then dried. This means that from this reference a method is known, with which one or more fiber strands are coated on their outer surface with a polymer, e.g. propylene, and said coated fiber strand is then processed to form a granulate in a first step. The coating with the polymer melt occurs, depending on the polymer used, at temperatures that in part are well over 200° Celsius. This means that already at this step the fibers are exposed to not insignificant thermal loads. A fiber strand produced in such a manner is then cut into granulates. It has been established that during the granulating procedure, i.e. during the cutting of the strand into individual sections, single fibers separate from the group, and extend above the individual granulates. This means that the fibers in the granulates are of quite different lengths. In another processing step, the cut granulates are fed into an extruder. In the extruder, a compound is produced through heat as well as mechanical effects, which should have a uniform distribution of the fibers in the mixture. Following the extrusion and molding to form an extrusion strand, the strand is again granulated in another step, and then processed as a material, in a die casting process, for example, to form work pieces.

It has, however, been determined in this connection, that the distribution of the fibers in finished work pieces is not uniform, i.e. it has been established that the work piece contains numerous so-called fiber clusters. The reason for this is quite clearly to be found in that the granulates produced in the first processing step actually exhibit, accordingly, a polymer layer on their outer surfaces. The coating with a polymer does not result, however, in a permeation of the fiber strand in the sense that also within the fiber strand, the polymer forms the matrix substance for the filaments. Regarding this, the processing of the granulate in the extruder clearly alters nothing. This means that the granulate according to the prior art has the disadvantage that the distribution of the fibers in the granulate, which ultimately serves for the production of the work piece, are not uniformly distributed, such that individual fiber clusters form in the work piece, resulting in a non-uniform consistency of a component produced thereby. Further, due to the introduction of heat in the two successive processing steps, this results in significant power consumption, firstly, and secondly, depending on the polymer used, and the associated melting temperature of said, in particular with polymers having a high melting point, such as polyamide, for example, when using cellulose fibers, there is the risk that said will be damaged. The cellulose fibers decompose in a manner dependent on the temperature, and the amount of time for which they are subjected to said thermal load.

Accordingly, the basic objective of the invention consists of providing a method for the production of a fiber strand wetted with a polymer, which enables the production of a granulate, having a homogenous distribution of filaments in the polymer matrix; furthermore, the thermal load during the production process should be kept small. For the following considerations, a fiber strand is defined as such having numerous filaments or fibers.

BRIEF DESCRIPTION OF THE INVENTION

A method of this sort for the production of a fiber-reinforced, thermoplastic polymer is characterized in that according to a first embodiment of the invention, at least one fiber strand is fed into an extrusion die, so that the fiber strand is fanned out in the extrusion die, wherein an impregnation of the fiber strand with a polymer melt takes place in its fanned out state. After the impregnation has taken place, the fiber strand is removed from the extruder die.

From this, the following is clear:

As a result of the impregnation with the polymer melt of the, at least one, fiber strand continuously fed into the extrusion die in its fanned out state, the polymer melt can be applied substantially to each individual filament of the fiber strand, such that the finished impregnated fiber strand has not only, as is the case with the prior art, a layer of polymer on its coating, but the polymer is homogenously distributed within the fiber strand. This means that the polymer forms a matrix for the filaments in the fiber strand.

It has already been indicated elsewhere that in accord with the prior art, the homogenization of the filaments in the plastic or polymer matrix should take place in a second step, when specifically the granulate from the first processing step is again fed into an extruder for homogenization. By the method of the present invention, this second step is eliminated since a fiber strand is already available after the first step in which the individual filaments are homogenously integrated in the matrix formed by the polymer. If a fiber strand impregnated in such a manner, (also referred to herein as a prepreg strand), is cut into a granulate in the subsequent production step, then there is no longer the risk that individual filaments protrude from the strand during the cutting process, having filaments or fibers of different lengths; rather, it is the case that as because of the individual filaments in the strand being bound by the polymer, said are maintained during the cutting, resulting in a smooth cut edge. This has not only the advantage with respect to a uniform consistency in the components produced using such a granulate, because the individual filaments have a defined length, but also results in a greater bulk material density of the granulate and an improved flow property, which has advantages in the transportation and storage of said.

It has already been mentioned elsewhere that from EP 1 436 130 B1 the use of cellulose or natural fibers for the production of fiber-reinforced compounds is known. Cellulose fibers have the characteristic that said, both depending on the temperature, as well as the length of the time period of the temperature to which the cellulose or natural fibers are exposed, show indications of decomposing during the treatment process. This is particularly the case when compounds are to be produced using polymers that melt at high temperatures. By means of the process according to the invention, the time period, in which the cellulose fibers, or in general, a temperature sensitive fiber, are subjected to a high temperature, is not only shortened because the method according to the invention is carried out in a single step, but also as a result of the exposure time being substantially shorter in the extrusion die than in an extruder. The mechanical demand on fibers or filaments is also substantially less with the method according to the invention, because the mechanical demands in the extruder are eliminated. A temperature sensitive fiber may be, as stated, a natural fiber, but it can also be an organic fiber, such as a PET fiber, for example.

On the whole, the other advantages in the following are obtained as a result of the method according to the invention:

By means of the single step characteristic of the method, it is possible to obtain a significant reduction in energy consumption; furthermore, the investments for producing a facility for executing the method are substantially reduced, wherein, in addition, the spatial and temporal requirements for producing a finished granulate are also minimized. Substantial advantages, however, are the limited thermal and mechanical loads to the fibers during the production, a defined and uniform fiber length of the fibers in a compound, and the homogeneity of the compound produced according to said method.

Advantageous characteristics and embodiments of the invention are derived from the dependent claims.

As such, according to one characteristic of the invention, it is provided that the, at least one, fiber strand is dried prior to being fed into the extrusion die. The drying for this is carried out immediately prior to the feeding of the fiber strand into the extrusion die, wherein the drying can be carried out using hot air or by means of radiant heat. The polymer melt is fed to the extrusion die by means of an extruder according to another characteristic of the invention.

There is a nozzle downstream of the extrusion die according to another advantageous characteristic of the invention, by means of which, firstly, a shaping, and secondly, a compression, of the impregnated fiber strand, is carried out.

It has already been indicated that with the use of temperature sensitive fibers, such as, in particular, cellulose or natural fibers, not only the temperature is decisive, but also the length of the time period of the effect of the temperature during the production process. In this respect, it is provided according to another characteristic of the invention, that a temperature control device be disposed downstream of the extrusion die. In the temperature control device, the prepreg strand exiting the extrusion die or nozzle is temperature controlled, in particular, cooled.

In addition, a device for compressing and, if applicable, shaping the impregnated prepreg strand may be provided downstream of the extrusion die. This can also be the temperature control device.

The prepreg strand, produced as a continuous strand, can then be granulated in a final step.

The subject matter of the invention is also the extrusion die for the fanning of at least one fiber strand and for impregnating said strand with a polymer melt, in particular for the execution of the method described above. The extrusion die is distinguished according to the invention by a fanning body as well as hood encasing the fanning body, wherein the hood has a central opening for the at least one fiber strand, wherein the, at least one, fiber strand is first fed laterally onto the fanning body, with its axis parallel to the fanning body, and then to the central opening in the hood, while fanning out the, at least one, fiber strand on the fanning body, wherein the fanning body has at least one discharge opening for the polymer melt. As a result of guiding the fiber strand over the fanning body, the fiber strand is fanned out, or spread, having the result that the individual filaments are more or less exposed, such that the polymer melt introduced in this region of the fanning body results in a homogenous embedding of the individual filaments of a fiber strand in the polymer melt.

In detail, it is provided herein that the fanning body has a head provided with a curvature, in particular a semispherical curvature. It has already been indicated elsewhere that the fanning body is encased, with a separating space, in a hood, thereby forming an annular space, wherein said hood has a central opening. The hood surrounds the curvature of the fanning body in such a manner that the central opening in the hood is aligned with the central longitudinal axis of the fanning body, such that the central opening is aligned with the pole of the semispherical curvature.

According to another characteristic of the invention, the head has a neck, wherein the neck is connected to a support, forming at least one opening for at least one fiber strand. From this it is clear that the fiber strand is first guided laterally along the fanning body, then the fiber strand is fed over the head through the central opening in the hood, and as a result, the fiber strand is fanned out, due to the lateral displacement of the fiber strand, because of being fed laterally at the neck to the central opening in the hood. This means that the maximal width of the fanning is dictated by the line in the transition from the neck to the head.

In this context, according to another advantageous characteristic of the invention, in the region of the transition to the head, the neck has at least one discharge opening for the polymer melt. This means that already during the fanning out in the region of the neck, and in this case in particular in the region of the transition from neck to head, the polymer melt is brought into contact with the individual filaments of the fiber strand.

According to a particular characteristic of the invention, it is provided in this context that there is a groove, running along a tangent to the head, at the discharge opening for the polymer melt. As a result, the polymer melt receives a twist in the circumferential direction of the fanning body, which contributes, in particular, to the individual filaments being wetted on all sides by the polymer melt during the fanning out of the fiber strand. In this context it is of particular importance to note that the hood, at least in the region of the discharge opening for the polymer melt, surrounds the fanning body to form a small radial spacing.

It is provided that, for the introduction of the melt, the support have an intake opening extending radially in the fanning body, which is connected to the, at least one, discharge opening for the polymer melt by means of a channel in the fanning body.

In detail, the support is constructed as a ring support, which surrounds the fanning body with, preferably distributed at numerous points on the periphery, however, separate openings for numerous fiber strands, wherein the neck has numerous discharge openings for the polymer melt, distributed over the periphery in the region of the transition to the head. From this there is the result that, at the same time, numerous fiber strands can be fed in a continuous process to the extrusion die, which accordingly are fanned out by the fanning body, and impregnated, and then however, numerous individual fiber strands can be removed from the extrusion die collectively as a strand through the central opening in the hood. This means that the cross-section of the central opening in the hood is significantly determined by the number of fiber strands and the thickness of the individual fiber strands. The impregnated strand exiting the hood is referred to as a prepreg strand.

The subject matter of the invention is also a device for the temperature control of a prepreg strand impregnated with a polymer melt. The temperature control, in particular the cooling, of the prepreg strand immediately after leaving the extrusion die is decisive for the quality of a compound offset with cellulose or natural fibers, insofar as that as a result of the duration of the thermal load to the temperature sensitive fibers, e.g. of cellulose or natural fibers, can be minimized. The device for temperature control is distinguished specifically by a pair of rollers, between which the prepreg strand is fed, wherein the rollers are temperature controlled, in particular, cooled.

According to one particular characteristic of the invention, it is provided that the rollers of the roller pair engage in one another in a tongue and groove fashion, wherein the fiber strand is fed into the groove. Through the selection of the size of the tongue and groove connection, or the distance of the rollers from one another, respectively, a compression of the prepreg strand as well as a shaping can be obtained.

A method for the production of a fiber-reinforced, thermoplastic polymer according to one of the two embodiments is distinguished in that the fiber strand sections are introduced into an extruder with a polymer, wherein a mixing of the filaments of the individual fiber strand sections with the polymer melted in the extruder takes place in the extruder, and a strand with filament sections enclosed in polymer is extracted from the extruder. Within the strand exiting the extruder, also referred to in the following as the extrusion strand, the individual filament sections are homogeneously distributed, embedded in the polymer. Also significant for this second method according to the invention, is that only one single process step is provided, in which the mixture of polymer melt and fiber or filament sections is subjected to both a mechanical as well as a thermal load. At this point it should once again be noted that according to the prior art, in accordance with EP 1 436 130 B1, the fibers are subjected to both mechanical as well as thermal loads in two successive steps, wherein, in particular, the thermal load is strongly dependent on which polymer is used. In contrast to this, with the method described above it is the case that in the extrusion strand extracted from the extruder, already after this one first step, a homogeneous distribution of the individual filament sections is present in the polymer. The application of the method is particularly interesting with the use natural or cellulose fibers, by way of example of a temperature sensitive fiber, because these are known to tend to decompose when affected by higher temperatures. As for the question of decomposing, not only the temperature is decisive, but also duration period of the effect of the temperature. In this context, it should be noted that the exposure time in the extruder is ca. 2-3 minutes, which means that due to the shortness of the exposure time to the fibers or filaments in the extruder, even with the pervading melting temperatures of the respective polymer, no decomposition of the fibers or filaments is to be expected.

Advantageous characteristics and embodiments of this second method are derived from the dependent claims dealt with subsequently.

As such, it is provided in particular that the, at least one, fiber strand is fed to a cutting device, the fiber strand, however, previously having been fed through a drying device, wherein the drying is carried out by means of hot air or radiant heat. The fiber strand formed from individual filaments or fibers is cut into individual sections, having a length of 1-10 mm, preferably 2-5 mm, by way of example, wherein due to the shortness of the individual sections and therefore the shortness of the individual filaments, a separation of the original filaments of the fiber strand, originally held together in a loose composite, occurs in the extruder by means of the screw of the extruder. A homogeneous distribution of the individual filaments or fibers in the polymer melt in the extruder is even more readily accomplished in relation to how short the strand sections are that are generated by the cutting device.

In this context, it is provided according to a particularly advantageous characteristic that the cutting device cut the fiber strand in a slicing manner. For the slicing type cutting in this manner, a method is referred to wherein the individual filaments of the strand section fan out or spread out with the result that the extruder is not fed a coherent fiber strand section as such, but rather an already fanned out fiber strand section. This has the advantage, accordingly, that a uniform distribution of the individual filaments in the polymer melt is obtained substantially more easily, with the result that the exposure period in the extruder, if applicable, can be shortened, bringing with it the advantages previously explained elsewhere regarding the thermal load to the fibers or filaments, in particular when this concerns a fiber strand of natural or cellulose fibers.

The fiber strand fed into the cutting device is wound onto a coil according to another characteristic of the invention, such that a continuous feeding to the cutting device occurs. In this context it can be provided in particular, that numerous coils are implemented, in order to feed a correspondingly larger number of fiber strand sections individually through a corresponding cutting device of the extruder after each cutting process. The length of the individual fibers or filaments is dependent on the cutting frequency when the feed rate remains constant, wherein the fiber quantity fed into the extruder on the whole is determined by the number of fiber strands fed into the cutting device.

According to another characteristic of the invention, the feeding of the polymer into the extruder is carried out by means of a dosing device, also known as a feeder, wherein, the quantity of polymer fed to the extruder is to be dosed according to the quantity of fibers and if applicable the lengths of the individual filaments.

As has been already explained a number of times elsewhere, with the use of cellulose fibers, the thermal load is to be kept as low as possible, in order to prevent decomposition of the cellulose fibers due to the effects of heat. This objective is also useful when the extrusion strand exiting the extruder is to be temperature controlled, in particular, cooled, immediately in a subsequent production step. The temperature control, in particular, the cooling, of the extrusion strand immediately after exiting the extruder is decisive for the quality of a compound offset with cellulose or natural fibers in that as a result, the duration of the thermal load to the cellulose or natural fibers can be minimized.

The device for temperature control is distinguished specifically by a pair of rollers, between which the extrusion strand is fed, wherein the rollers are temperature controlled, in particular, cooled. According to a particular characteristic of the invention, it is provided that the rollers of the roller pair engage in one another in the manner of a tongue and groove connection, wherein the fiber strand is fed into the groove. By means of the selection of the size of the tongue and groove connection, or through the degree of engagement of the rollers with one another as well, a compression of the extrusion strand and a shaping of said can be obtained.

Based on the drawings, the invention shall be explained in an exemplary fashion in the following.

DETAILED DESCRIPTION OF THE INVENTION

Figure 1:
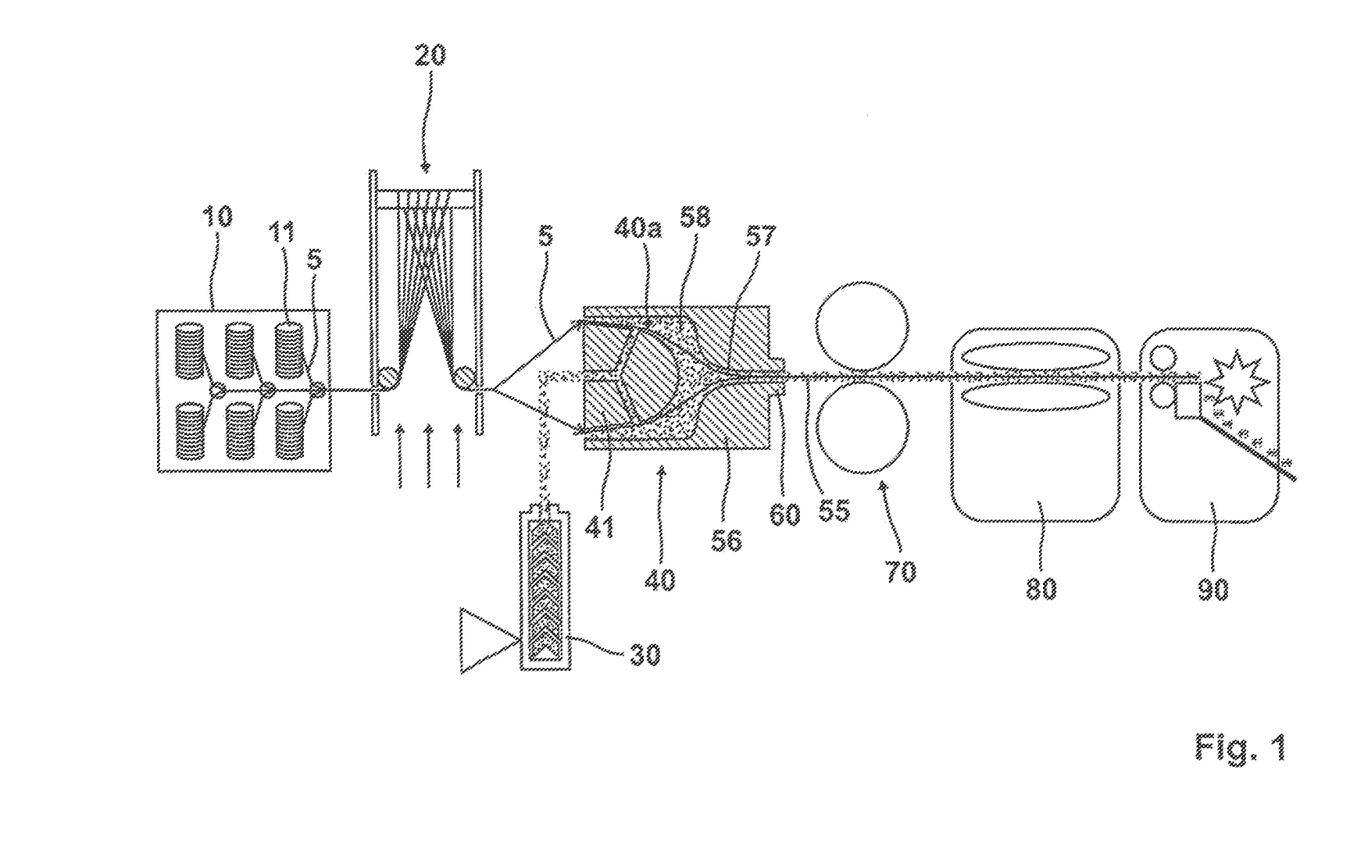
FIG. 1 shows schematically the individual procedural steps for the production of the compound according to the invention.

The explanation of the first method is carried out using FIG. 1. The coil case, indicated by the number 10, comprises six coils 11, wherein of the six coils 11, one fiber strand 5 from each coil is continuously removed and accordingly fed continuously to the other processing stations of the method, such that a continuous prepreg strand is created that is fed to the granulating device. One of each of these fiber strands 5 is sent to a drying device 20, wherein the individual fiber strands 5 are dried in the drying device 20 by means of, for example, hot air or radiant heat, before being sent as individual fiber strands 5 to the extrusion die, indicated by the number 40. The extrusion die 40 comprises the fanning body, indicated by the number 41, and the hood, indicated by the number 56. The hood 56 forms a space around the fanning body 41, thereby forming an annular space 58. Furthermore, and extruder 30 is provided, which introduces a polymer melt into the annular space 58 between the hood and the fanning body 41. The fiber strands 5 are each separately fed into the space 58, wherein a fanning out of the individual fiber strands occurs in the region of the arrow 40a, as has been explained previously, and as is also the subject matter of the invention. Then the individual fiber strands 5 are extracted from the extrusion die 40 through the central opening 57. The individual fiber strands 5 form thereby an impregnated fiber strand, referred to as a prepreg strand 55. The prepreg strand 55 passes through a nozzle 60, which serves for the compression and also the shaping of the impregnated fiber strand.

Next, the prepreg strand 55 is sent to a temperature control device 70, which will be explained in greater detail elsewhere.

After passing through the temperature control device, a discharge conveyor is provided, indicated by the number 80, disposed downstream of a granulating device 90 for the production of the compound granulate.

Figure 2:
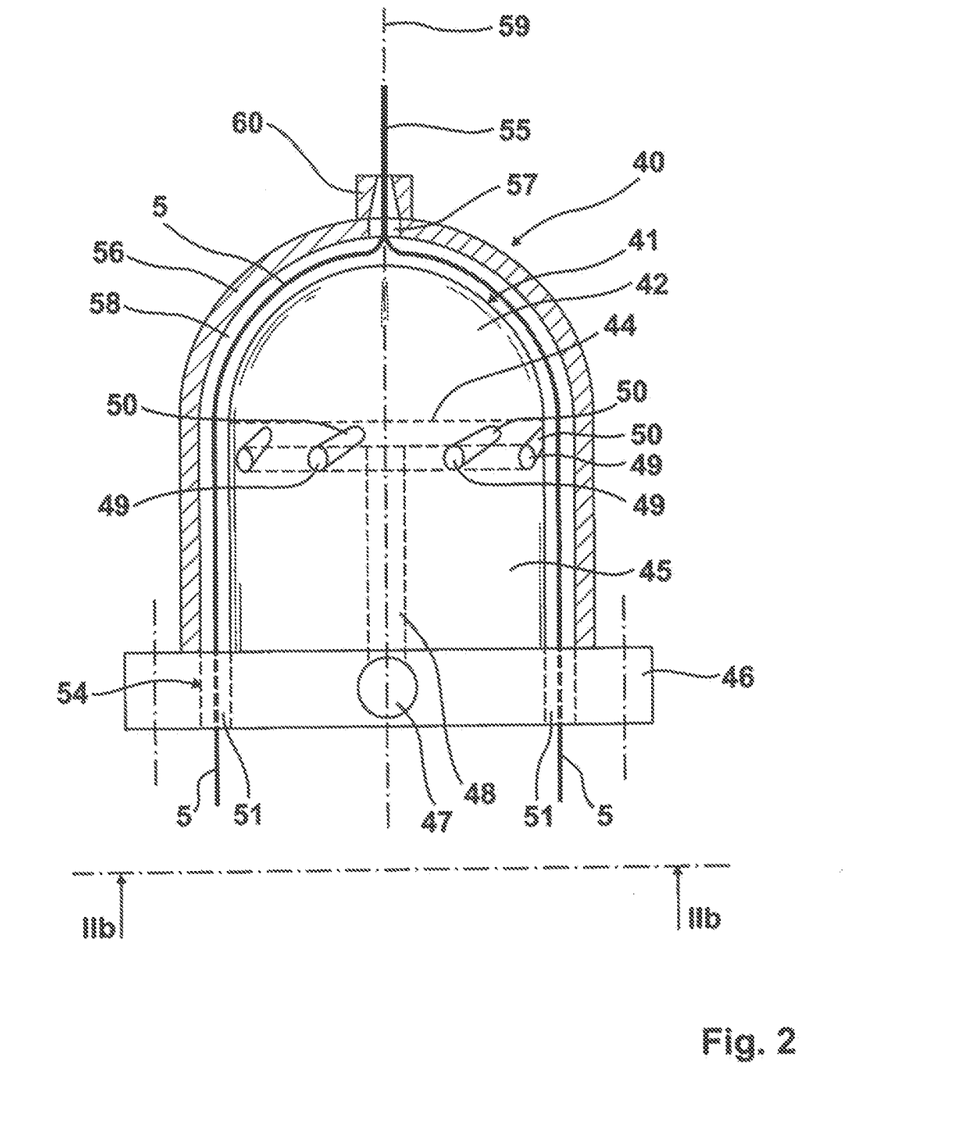
FIG. 2 shows a schematic sectional side view of the extrusion die.
Figure 2A:
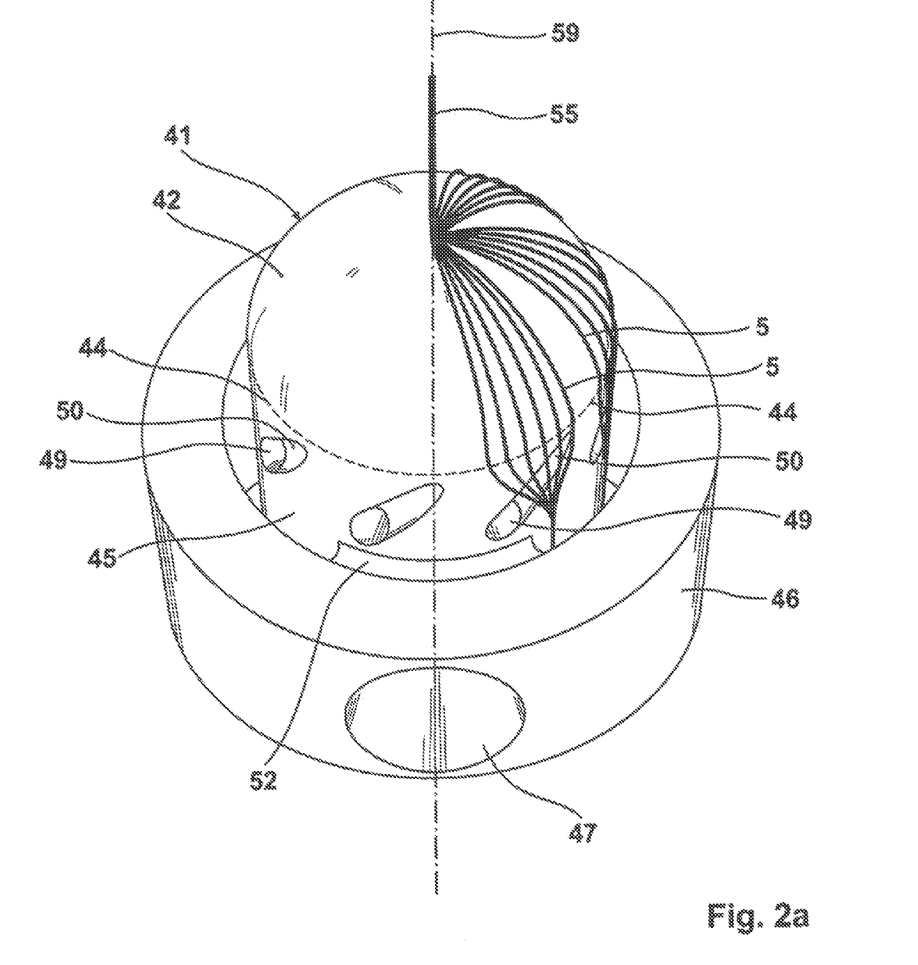
FIG. 2a shows a perspective illustration of the fanning body without the hood.
Figure 2B:
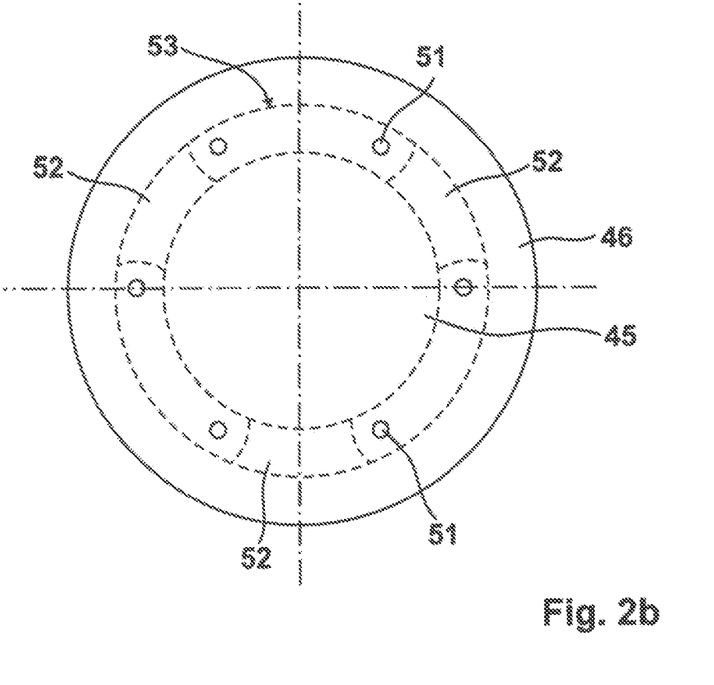
FIG. 2b shows a perspective illustration of the extrusion die from dotted line IIb in FIG. 2.

FIG. 2 shows the design of the extrusion die 40. The extrusion die 40 is comprised, as explained above, of the fanning body 41 and the hood 56 surrounding the fanning body. Between the hood 56, and the fanning body 41, a space exists, forming the annular space indicated by the number 58. The fanning body 41 comprises the head 42, provided with a semispherical curvature, to which the neck 45 is connected. The neck has a support 46 in the form of a ring at the end opposite the head, which extends laterally beyond the cover of the fanning body, and which is connected by struts 52 to the neck (FIG. 2a). The support 46 has a radially extending intake opening 47 for the polymer melt from the extruder 30, wherein the intake opening 47 ends in a channel 48 disposed centrally in the fanning body 41, running along the central longitudinal axis 59 of the fanning body. The channel 48 extends to the region of the head 42. Discharge openings are provided on the periphery of the neck, prior to the transition to the head, extending radially from the channel 48, wherein for each of the discharge openings 49 for the polymer melt there is a groove 50 running, along a tangent to the cover surface of the fanning body 41, to the head. The ring shaped support 46 is radially distanced from the fanning body 41. The connection between the ring shaped support 46, and the fanning body 41 is established through at least one strut 52. The radial spacing between the fanning body and the support 46 is covered by means of a type of perforated sheet 53, having numerous openings 51 for the passage of one fiber strand 5, respectively, into the annular space 54, passing laterally along the neck of the fanning body 41.

The hood, indicated by the number 56, has the central opening 57, wherein the central opening is aligned with the central longitudinal axis 59 of the fanning body 41. This means that the central opening 57 of the hood is located above the apex of the semispherical head 42.

The introduction of the individual fiber strands 55 takes place, as previously explained, through the individual openings 51. The region of the transition from neck 45 to head 42, indicated by the broken line 44, is where the fanning out of the fiber strands into the individual filaments forming the fiber strand takes place. The fanning out as seen from above is basically in the shape of a rhomboid. The discharge openings 49 for the polymer melt with the connected tangential grooves 50 are also located in this region. In particular, the impregnation takes place in this region, i.e. the region of the spreading or fanning out of the fiber strand into individual filaments. The polymer melt is given a twist in the direction of the grooves, i.e. towards the head, by means of the grooves which each are connected to the discharge openings 49, resulting in a turbulence in the melt in this region, with the result that an intensive wetting of the individual filaments takes place. The individual fiber strands 5 are then collectively discharged from the opening 57 as a prepreg strand 55 into the hood, and then compressed by the nozzle 60.

Figure 3:
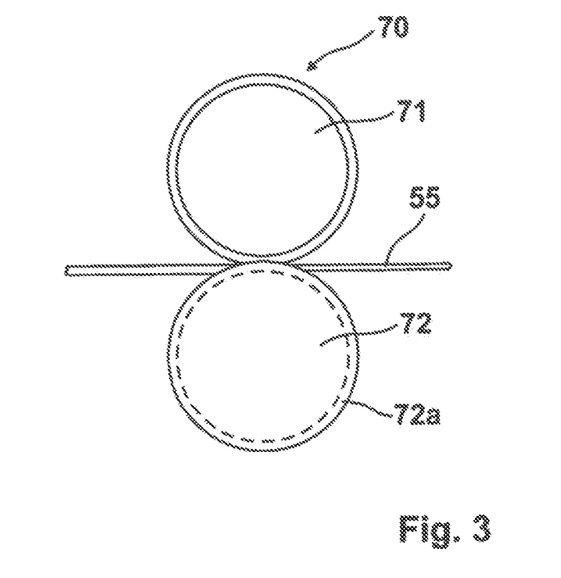
FIG. 3 shows the temperature control device in the form of a pair of rollers, in a side view.
Figure 3A:
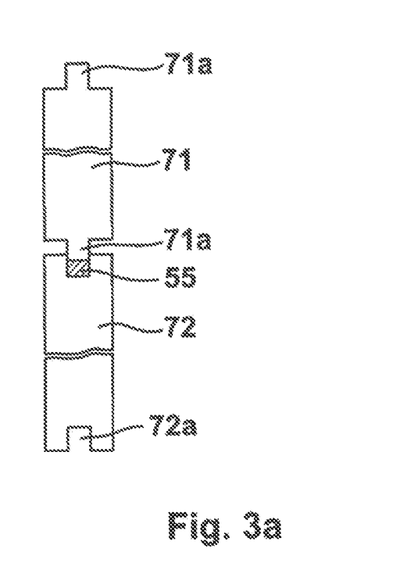
FIG. 3a shows a view according to the line III a/III a from FIG. 3.

This prepreg strand 55 is then sent to the temperature control device 70 depicted in FIGS. 3 and 3a. The temperature control device 70 comprises two rollers 71, 72 which rotate in opposite directions, wherein the roller 72 has a peripheral groove 72a and the roller 71 has a peripheral tongue 71a, corresponding thereto. The tongue and groove engage in one another, as can be seen in FIGS. 3 and 3a, whereby the prepreg strand is fed into the groove 72a. Through the selection of the appropriate size of the groove 72a and corresponding to this, the peripheral tongue 71a, both a compression as well as a shaping of the prepreg strand can take place. Furthermore, the rollers serve as a component of the temperature control device 70, for either the cooling or heating of the prepreg strand, depending on what is desired. In particular, a cooling of the rollers results in a faster cooling of the prepreg strand and a reduction of the thermal load to the fibers, which is significant when cellulose or natural fibers are used in connection with a polymer having a higher melting point.

Figure 4:
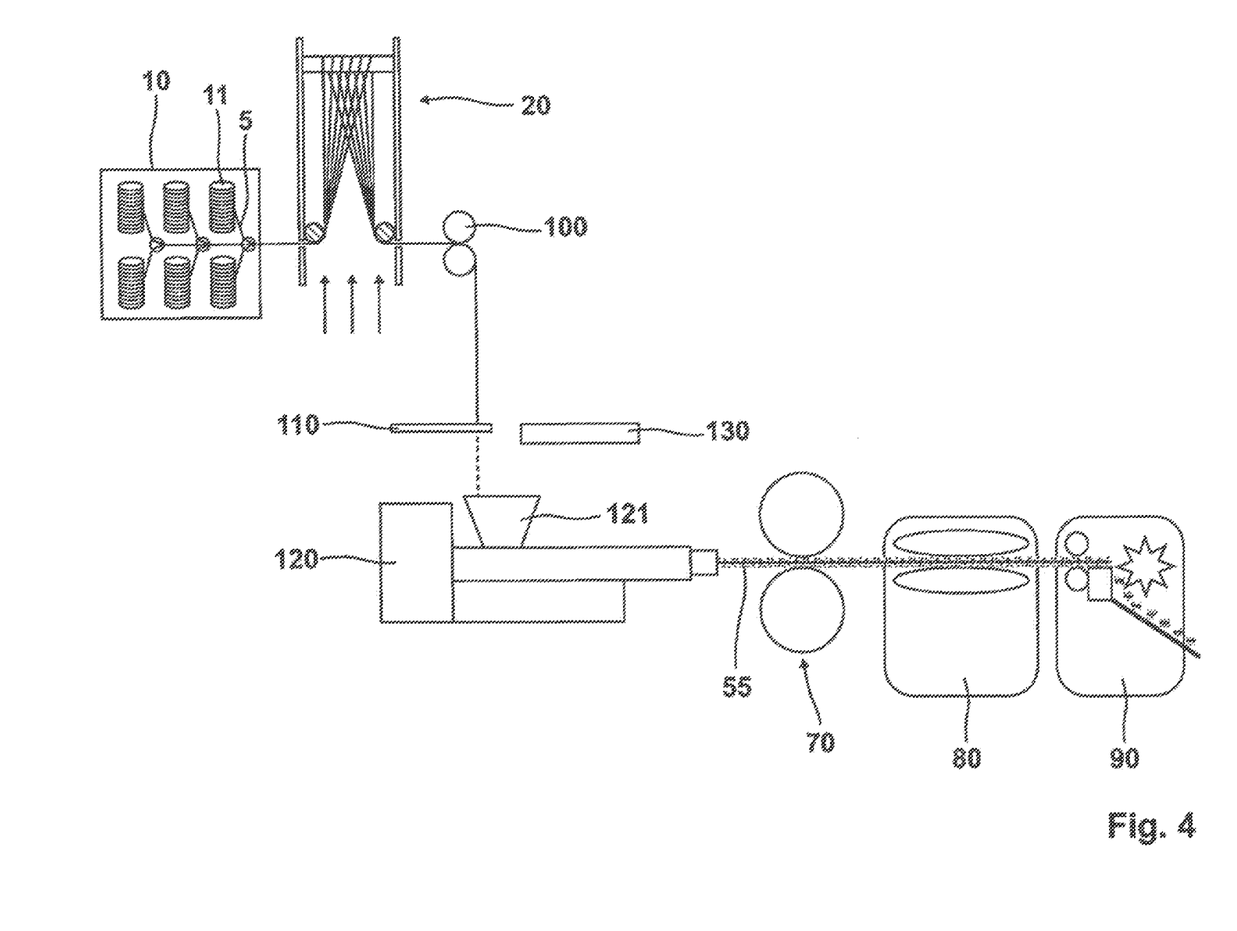
FIG. 4 shows schematically the method with a second embodiment, wherein cut fiber strand sections are fed directly to an extruder.
Figure 5:
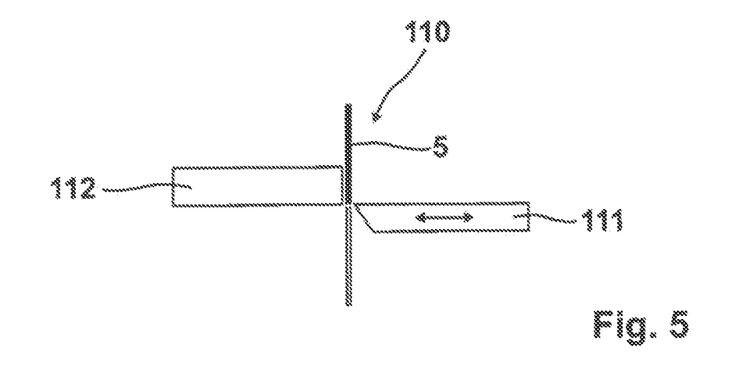
FIG. 5 shows schematically the cutting device.
Figure 6:
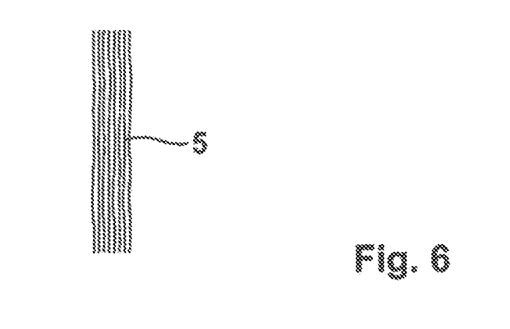
FIG. 6 shows schematically a cut fiber strand section.

The method according to a second embodiment is shown in FIG. 4. Here, in turn, a coil case 10 is provided, containing numerous coils 11. A fiber strand 5 is taken from each of the coils 11 by means of a conveyor 100, wherein the conveyor 100 is depicted as a pair of rollers rotating in opposite directions, through which the individual fiber strands 5 are separately fed to a cutting device 110. A drying device 20 may be provided between the coil case 10 and the conveyor 100, as previously been described. The cutting device 110 can be derived schematically from the depiction according to FIG. 5. According to FIG. 5, a moving blade is provided that slides along a cutting block 112 when slicing the fiber strand 5. Depending on the length of the cut fiber strand sections, a shape of the cut section is obtained, corresponding basically to the that in FIG. 6. It is visible here that the fiber strand section is spread out, or fanned out into individual fibers or filaments by means of the slicing. This has definite advantages when the individual fiber strand sections, spread out in this manner, are fed to the extruder 120 by the funnel 121. The polymer, by way of example in the form of a granulate, is also added to the funnel by means of the dosing device 130. An extrusion strand 55a is extracted from the extruder 120, consisting of a thermoplastic polymer, containing the individual filaments of the fiber stand sections, embedded homogenously, or uniformly distributed therein. The extrusion strand, indicated by the number 55a, is sent to the temperature control device, also indicated in FIG. 4 by the number 70, also according to a characteristic of this method. The temperature control device 70 comprises two rollers 71, 72 rotating in opposite directions, wherein the roller 72 contains a peripheral groove 72a, and the roller 71 contains a corresponding peripheral tongue 71a. The tongue and groove engage, as can be seen in FIGS. 3 and 3a, in one another, wherein the extrusion strand 55a is fed into the groove 72a. Through the selection of the appropriate size of the groove 72a and corresponding to this, the peripheral tongue 71a, both a compression as well as a shaping of the prepreg strand can take place. Furthermore, the rollers serve as a component of the temperature control device 70 for either the cooling or heating of the prepreg strand, depending on what is desired. In particular, a cooling of the rollers results in a faster cooling of the prepreg strand and a reduction of the thermal load to the fibers, which is significant when cellulose or natural fibers are used in connection with a polymer having a higher melting point.

A band take-up, indicated by the number 80, is disposed downstream of the temperature control device, as well as the granulating device 90 for producing the compound granulate.

Figure 7:
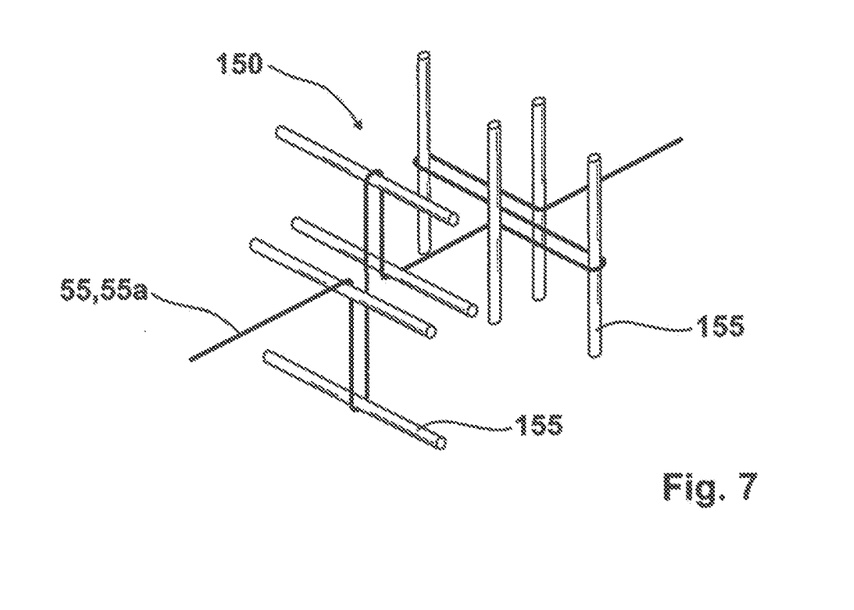
FIG. 7 shows schematically a deflecting device, which can be disposed downstream of the extrusion die ($1^{st}$ embodiment) or the extruder ($2^{nd}$ embodiment).

In order for an even better mixing or wetting of the individual fibers of the prepreg strand 55, or the extrusion strand 55a, to be obtained, the strand 55, 55a can be doubled back numerous times immediately after leaving the extrusion die 40 or the extruder 120. This is accomplished by means of the device 150 according to the schematic presentation in FIG. 7. The doubling back device 150 comprises numerous, in particular, rotatable cylinders or rollers 155, offset to one another, wherein, as a result of the doubling back of the strand, a kneading of the strand is obtained, with the result that the wetting degree of the fibers with the polymer melt is increased to an even greater degree. The doubling back in this case is in a meandering shape, wherein additionally, a lateral bending can also be carried out.

Reference Symbol List

5 Fiber strand
10 Coil case
11 Coils
20 Drying device
30 Extruder
40 Extrusion die
40a Arrow
41 Fanning body
42 Head
44 Broken line
45 Neck
46 Support
47 Intake opening for polymer melt
48 Channel
49 Discharge opening for polymer melt
50 Tangential groove of the discharge opening 49
51 Opening between the neck of the fanning body and the support
52 Strut between support and neck
53 Perforated sheet
54 Annular space between support and neck
55 Prepreg strand
55a Extrusion strand
56 Hood
57 Central opening in the hood
58 Annular space between the hood and the fanning body
59 Central longitudinal axis
60 Nozzle
70 Temperature control device
71 Roller
71a Tongue on the roller of 71
72 Roller
72a groove on the roller of 72
80 Band take-up
90 Granulating device
100 Conveyor unit
110 Cutting device
120 Extruder
121 Funnel
130 Dosing unit
150 Doubling back device
155 Doubling back rollers, doubling back cylinders It is claimed:

1. A method for the production of a fiber-reinforced, thermoplastic polymer, said method comprising the steps of:
providing at least one fiber strand having a plurality of fibers;
providing an extrusion die, the extrusion die comprising;
a fanning body having a neck and a semispherical head, the fanning body further having at least one intake opening for receiving a polymer melt and at least one discharge opening for discharging the polymer melt;
a hood encompassing the fanning body, the hood having a central opening beyond the fanning body for extruding the at least one fiber strand and polymer melt;
feeding said at least one fiber strand into said extrusion die so that said at least one fiber strand is fanned out on the semispherical head of the fanning body in said extrusion die;

impregnating said at least one fiber strand with a polymer melt while it is in said extrusion die and while it is in said fanned out state; and extracting said at least one fiber strand which has been impregnated with said polymer from said extrusion die.

2. The method according to claim 1, wherein said at least one fiber strand is dried prior to being fed into the extrusion die.

3. The method according to claim 1, wherein the polymer melt is fed into the extrusion die by an extruder.

4. The method according to claim 1, wherein the at least one fiber strand is fed through a nozzle as a prepreg strand after the impregnation.

5. The method according to claim 4, wherein the prepreg strand is temperature controlled in a device after the impregnation.

6. The method according to claim 4, wherein the prepreg strand is compressed in a device.

7. The method according to claim 4, wherein the prepreg strand is shaped in a device.

8. The method according to claim 4, wherein the prepreg strand is granulated in a granulating device.

9. The method according to claim 1, comprising a process for the production of a fiber-reinforced thermoplastic polymer in the form of a continuous prepreg strand.

10. A device for the temperature control of a prepreg strand impregnated with a polymer melt, comprising:
an extrusion die comprising;
a fanning body having a neck and a semispherical head, the fanning body further having at least one intake opening for receiving a polymer melt and at least one discharge opening for discharging the polymer melt;
a hood encompassing the fanning body, the hood having a central opening beyond the fanning body for extruding the at least one fiber strand and polymer melt;
a pair of rollers between which a prepreg strand is fed from the extrusion die, wherein the rollers are temperature controlled.

11. The device according to claim 10, wherein the rollers engage in one another in the manner of a tongue and groove connection wherein the groove is configured to receive the prepreg strand in the use of the device.

12. An extrusion die for fanning out at least one fiber strand having a plurality of fibers and for impregnating the at least one fiber strand with a polymer melt, the extrusion die comprising:
a fanning body having a neck and a semispherical head, the fanning body further having at least one intake opening for receiving a polymer melt and at least one discharge opening for discharging the polymer melt;
a hood encompassing the fanning body, the hood having a central opening beyond the fanning body for extruding the at least one fiber strand and polymer melt;
wherein the extrusion die is configured so that the at least one fiber strand is fed along the neck and onto the semispherical head of the fanning body to the central opening in the hood such that the plurality of fibers of the at least one fiber strand are fanned out upon the fanning body in a region of the at least one discharge opening.

13. The extrusion die according to claim 12, further comprising a support, the neck of the fanning body connected to the support so as to form at least one opening for said at least one fiber strand.

14. The extrusion die according to claim 13, wherein the support is a ring support.

15. The extrusion die according to claim 13, wherein a transition is defined between the neck and the head, at least one of the discharge openings for the polymer melt being defined in the region of the transition to the head.

16. The extrusion die according to claim 13, wherein the support has an intake opening for the polymer melt defined in, and extending radially from the fanning body, said intake opening connected by means of a channel in the fanning body to the, at least one, discharge opening for the polymer melt.

17. The extrusion die according to claim 13, wherein the support is a ring support which surrounds the fanning body at a distance so as to form, a plurality of openings disposed on the periphery thereof for a corresponding number of fiber strands, wherein the neck has a plurality of discharge openings for the polymer melt, disposed on its periphery in the region of the transition to the head.

18. The extrusion die according to claim 12, wherein the fanning body further includes a groove which runs tangentially in the direction of the head and is connected to the at least one discharge opening.

* * * * *